United States Patent
Li et al.

(10) Patent No.: US 10,917,842 B2
(45) Date of Patent: Feb. 9, 2021

(54) ACCESS POINT CONNECTION METHOD AND TERMINAL

(71) Applicant: HUAWEI TECHNOLOGIES CO., LTD., Shenzhen (CN)

(72) Inventors: Yalei Li, Xi'an (CN); Fei Cen, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/468,724

(22) PCT Filed: Mar. 16, 2017

(86) PCT No.: PCT/CN2017/076996
§ 371 (c)(1),
(2) Date: Jun. 12, 2019

(87) PCT Pub. No.: WO2018/107603
PCT Pub. Date: Jun. 21, 2018

(65) Prior Publication Data
US 2020/0015159 A1    Jan. 9, 2020

(30) Foreign Application Priority Data
Dec. 12, 2016  (CN) .......................... 2016 1 1141249

(51) Int. Cl.
*H04W 48/20*     (2009.01)
*H04B 17/318*    (2015.01)
(Continued)

(52) U.S. Cl.
CPC .......... *H04W 48/20* (2013.01); *H04B 17/318* (2015.01); *H04M 15/31* (2013.01); *H04W 24/10* (2013.01); *H04W 48/14* (2013.01)

(58) Field of Classification Search
CPC ..... H04W 48/20; H04W 24/10; H04W 48/14; H04W 48/10; H04W 24/08; H04W 84/12;
(Continued)

(56) References Cited

U.S. PATENT DOCUMENTS

2009/0207824 A1* 8/2009 Lee ....................... H04W 88/08
                                                                   370/338
2012/0281581 A1   11/2012 Liu
(Continued)

FOREIGN PATENT DOCUMENTS

CN       101909326 A     12/2010
CN       103384409 A     11/2013
(Continued)

*Primary Examiner* — Rina C Pancholi
(74) *Attorney, Agent, or Firm* — Kilpatrick Townsend & Stockton LLP

(57) ABSTRACT

Embodiments of this application relate to the communications field, and provide an access point connection method and a terminal, so as to preferentially connect to a traffic-free access point, reduce traffic consumption of a user, and improve video experience of the user. The method specifically includes: A terminal first obtains a charging type of each of at least one AP, where the AP charging type includes a traffic-free AP and a traffic-charged AP; and then the terminal selects an AP for connection based on the charging type of each of the at least one AP and an AP connection priority. A connection priority of the traffic-free AP is higher than that of the traffic-charged AP. This application is used to connect to an AP by a terminal.

20 Claims, 10 Drawing Sheets

```
A terminal obtains a charging type of each of at least one AP    — S401

The terminal displays the charging type of each AP on an AP
connection interface                                              — S402a The terminal selects an AP for connection based on the charging
type of each of the at least one AP and an AP connection priority — S402
```

(51) Int. Cl.
  *H04M 15/00* (2006.01)
  *H04W 24/10* (2009.01)
  *H04W 48/14* (2009.01)

(58) Field of Classification Search
  CPC ...... H04W 4/24; H04B 17/318; H04M 15/31; H04M 15/70; H04M 15/72; H04M 15/725; H04M 15/00; H04L 12/14
  See application file for complete search history.

(56) References Cited

U.S. PATENT DOCUMENTS

| | | | | |
|---|---|---|---|---|
| 2013/0304847 | A1* | 11/2013 | Ewanchuk | H04L 69/14 709/217 |
| 2014/0235167 | A1* | 8/2014 | Jung | H04W 76/10 455/41.2 |
| 2015/0131483 | A1* | 5/2015 | Colban | H04W 48/20 370/254 |
| 2015/0237560 | A1* | 8/2015 | Saida | H04W 48/16 370/331 |
| 2016/0066261 | A1* | 3/2016 | Nasielski | H04M 15/8044 455/406 |
| 2017/0374071 | A1* | 12/2017 | Visuri | H04L 63/101 |
| 2018/0343609 | A1 | 11/2018 | Gu | |

FOREIGN PATENT DOCUMENTS

| | | | | |
|---|---|---|---|---|
| CN | 103517372 | A * | 1/2014 | ............ H04W 48/20 |
| CN | 103517372 | A | 1/2014 | |
| CN | 104202797 | A | 12/2014 | |
| CN | 105873177 | A | 8/2016 | |
| EP | 3032879 | A1 | 6/2016 | |
| WO | 2009094474 | A2 | 7/2009 | |
| WO | 2013189260 | A1 | 12/2013 | |

* cited by examiner

ACCESS POINT CONNECTION METHOD AND TERMINAL

CROSS-REFERENCE TO RELATED APPLICATIONS

This application is a national stage of International Application No. PCT/CN2017/076996, filed on Mar. 16, 2017, which claims priority to Chinese Patent Application No. 201611141249.X, filed Dec. 12, 2016 which are hereby incorporated by reference in their entireties.

TECHNICAL FIELD

This application relates to the communications field, and in particular, to an access point (Access Point, AP) connection method and a terminal.

BACKGROUND

With rapid development of intelligent terminals, Wireless Fidelity (Wireless Fidelity, WiFi) has been widely used to connect terminals to the Internet. A WiFi connection architecture includes an AP and a terminal. The AP provides a wireless access service, allows access from the terminal, and provides data access for the terminal. The terminal is connected to the AP to access data by using the AP. For example, a common wireless router or a bridge works in an AP mode, and serves as an access point providing wireless access for the terminal. When a WiFi hotspot is set up on a mobile phone, the mobile phone also works in the AP mode, and serves as an access point providing wireless access for the terminal.

When the terminal is connected to the AP to access the Internet, there are two charging modes: a traffic-based charging mode and a non-traffic-based charging mode. Correspondingly, APs also include a traffic-charged AP and a traffic-free AP. For example, when a mobile phone enables a hotspot function to serve as an AP, after being connected to the AP to access the Internet, another terminal consumes data traffic of the mobile phone, and therefore, an operator performs traffic-based charging. For example, a yearly-package home broadband network, or monthly-package or 7-day portable WiFi with unlimited traffic may not be charged based on traffic after lump-sum payment, and an AP that provides a wireless access service in the broadband network is a traffic-free access point, and no extra charge is incurred when the terminal connected to the traffic-free access point accesses the Internet.

Currently, when a user connects a terminal to an AP, a specific AP to be connected or a specific AP to be switched to is determined by terminal according to an operation instruction of the user. For example, if there is only a traffic-charged AP in a special scenario, to meet a requirement, the user operates the terminal to connect to the traffic-charged AP for accessing the Internet; and when the user moves to a location at which a traffic-free AP exists, the user operates the terminal again to switch to the traffic-free AP for connection, to save Internet access fees.

However, after the user operates the terminal to connect to the traffic-charged AP, when the user moves to the location at which the traffic-free AP exists, if the user forgets to operate the terminal again to switch to the traffic-free AP and uses a large amount of traffic, a large amount of traffic is consumed, and consequently, a large quantity of traffic fees are incurred, and user experience is degraded.

SUMMARY

Embodiments of this application provide an AP connection method and a terminal, so as to preferentially connect to a traffic-free access point, reduce traffic consumption of a user, and improve video experience of the user.

To achieve the foregoing objectives, the embodiments of this application use the following technical solutions.

According to a first aspect, an AP connection method is provided, including: A terminal first obtains a charging type of each of at least one AP, where the AP charging type includes a traffic-free AP and a traffic-charged AP; and then the terminal selects an AP for connection based on the charging type of each of the at least one AP and an AP connection priority.

According to the AP connection method provided in this embodiment of this application, after obtaining the charging type of each AP, the terminal preferentially selects the traffic-free AP for automatic connection. In this way, when the terminal used by a user moves to a location at which the traffic-free AP is deployed, regardless of whether an AP to which the terminal is previously connected is charged based on traffic, in the solution in this embodiment of this application, the terminal switches to the traffic-free AP, thereby reducing traffic consumption and traffic fees incurred when the user uses the terminal. In this solution, the terminal operates automatically without user participation, thereby improving user experience.

With reference to the first aspect, in a possible implementation, a specific implementation solution for obtaining, by a terminal, a charging type of each of at least one AP is provided and may include: performing, by the terminal, AP scanning, and receiving a scan response packet sent by each of the at least one AP, where the scan response packet includes an indication field indicating the charging type of the sender AP; and obtaining, by the terminal, the charging type indicated by the indication field in the scan response packet sent by each AP. A current scan response mechanism used for connecting to the AP is also considered. In the scan response packet, the AP charging type is indicated by using the indication field, and therefore, an implementation solution is simple and communication resources are saved.

With reference to the first aspect or the foregoing possible implementation, in a possible implementation, another specific implementation solution for obtaining, by a terminal, a charging type of each of at least one AP is provided and may include: receiving, by the terminal, a broadcast message sent by each of the at least one AP, where the broadcast message includes an indication field indicating the charging type of the sender AP; and obtaining, by the terminal, the charging type indicated by the indication field in the broadcast message sent by each of the at least one AP. The indication field indicating the AP charging type is sent by using the broadcast message, and the current scan response mechanism used for connecting to the AP does not need to be modified, thereby ensuring security of a scan connection mechanism and reducing a connection failure risk.

With reference to the first aspect, in a possible implementation, an AP of an inexplicit charging type inevitably exists in a network, and this AP is referred to as an AP with an unknown charging mode. To improve compatibility of the solution, the AP charging type further includes the AP with an unknown charging mode. AP connection priorities in descending order are successively: the traffic-free AP, the AP with an unknown charging mode, and the traffic-charged AP. When the AP charging type includes the traffic-free AP, the traffic-charged AP, and the AP with an unknown charging mode, a specific implementation of selecting, by the terminal, an AP for connection based on the charging type of each of the at least one AP and an AP connection priority is provided and may include: if a traffic-free AP exists in the at least one AP, selecting the traffic-free AP for connection; if a traffic-free AP does not exist but an AP with an unknown charging mode exists in the at least one AP, selecting the AP with an unknown charging mode for connection; or if neither a traffic-free AP nor an AP with an unknown charging mode exists but a traffic-charged AP exists in the at least one AP, selecting the traffic-charged AP for connection. Compared with the traffic-charged AP, the AP with an unknown charging mode may be a traffic-free AP. Therefore, a connection priority of the AP with an unknown charging mode is higher than that of the traffic-charged AP. Therefore, the solution described in the implementation of this embodiment of this application is compatible with all types of APs in the network, thereby improving compatibility of the connection solution.

With reference to the first aspect or any one of the foregoing possible implementations, in a possible implementation, with the development of technologies, after charging types of all APs are explicitly indicated, and the AP charging type includes the traffic-free AP and the traffic-charged AP, a specific implementation of selecting, by the terminal, an AP for connection based on the charging type of each of the at least one AP and an AP connection priority is provided and may include: if a traffic-free AP exists in the at least one AP, selecting the traffic-free AP for connection; or if a traffic-free AP does not exist but a traffic-charged AP exists in the at least one AP, selecting the traffic-charged AP for connection. A process of selecting the AP for connection based on the AP charging type and the AP connection priority is specifically implemented.

It should be noted that specific content about the AP connection priority is not specifically limited in this embodiment of this application and may be configured based on an actual requirement.

With reference to the first aspect or any one of the foregoing possible implementations, in a possible implementation, the selecting the traffic-free AP for connection specifically includes: if the terminal is connected to the traffic-free AP, keeping the connection unchanged; or if the terminal is connected to the traffic-charged AP, or is connected to the AP with an unknown charging mode, or is not connected to any AP, selecting a traffic-free AP from the at least one AP for connection. It can be learned that the selecting a type of AP for connection described in this specification is different depending on whether the terminal is connected to an AP currently. When the terminal is currently connected to an AP, the terminal switches to the selected AP; or when the terminal is not connected to an AP currently, the terminal is connected to the selected AP. Connection of the terminal to an AP in different scenarios is implemented.

With reference to the first aspect or any one of the foregoing possible implementations, in a possible implementation, after the obtaining, by a terminal, a charging type of each of at least one AP, the AP connection method provided in this application may further include: displaying, by the terminal, the charging type of each AP on an AP connection interface. In this way, the user can manually select, based on the AP charging type and the AP connection priority, the AP meeting a current requirement for connection. In this case, the selecting, by the terminal, an AP for connection based on the charging type of each of the at least one AP and an AP connection priority may be specifically implemented as follows: receiving, by the terminal, a connection request entered by a user of the terminal, where the connection request includes a to-be-connected AP selected by the user based on the AP connection priority; and connecting, by the terminal, to the AP indicated by the connection request.

With reference to the first aspect or any one of the foregoing possible implementations, in a possible implementation, the selecting, by the terminal, an AP for connection based on the charging type of each of the at least one AP and an AP connection priority may be specifically implemented as follows: if the terminal is not connected to any AP currently, displaying reminder information on a terminal screen, where the reminder information is used to remind the user of the terminal about a connectable AP; and after receiving a connection instruction entered by the user, connecting, by the terminal, to the AP selected by the user. When the terminal is not connected to an AP, the user is actively prompted to connect to an AP, thereby reducing traffic consumption and fees of the user, and improving user experience.

With reference to the first aspect or any one of the foregoing possible implementations, in a possible implementation, the reminder information may include an identifier of the to-be-connected AP selected by the terminal based on the charging type of each of the at least one AP and the AP connection priority; the user only needs to confirm the reminder information, and the terminal receives a connection instruction; and an AP that is selected by the user and that is corresponding to the connection instruction is the AP indicated by the AP identifier included in the reminder information.

With reference to the first aspect or any one of the foregoing possible implementations, in a possible implementation, the reminder information may include an identifier of the to-be-connected AP selected by the terminal based on the charging type of each of the at least one AP and the AP connection priority; for the reminder information, the user may alternatively select an AP that is not indicated by the reminder information for connection, and a connection instruction received by the terminal includes an identifier of an AP selected by the user; and the AP that is selected by the user and that is corresponding to the connection instruction is the AP indicated by the AP identifier included in the connection instruction.

With reference to the first aspect or any one of the foregoing possible implementations, in a possible implementation, the selecting, by the terminal, an AP for connection based on the charging type of each of the at least one AP and an AP connection priority may be specifically implemented as follows: if the terminal is not connected to any AP currently, displaying reminder information on a terminal screen, where the reminder information is used to remind the user of the terminal about a connectable AP and the charging type of each AP; and after receiving a connection instruction entered by the user, connecting, by the terminal, to the AP selected by the user. The connection instruction is entered by the user after the user selects the AP based on the AP charging type and the AP connection priority. When the terminal is not connected to an AP, the user is actively prompted to connect to an AP, thereby reducing traffic consumption and fees of the user, and improving user experience.

With reference to the first aspect or any one of the foregoing possible implementations, in a possible implementation, the AP charging type is an attribute default value of the AP, or the AP charging type is a value entered by a user. Specifically, the AP charging type is configured at an AP end.

It should be noted that the at least one AP described in this embodiment of this application is an AP whose WiFi signal can be received by the terminal at a geographic location of the terminal, and the terminal can access the Internet after the terminal is connected to the AP.

According to a second aspect, an AP list display method is provided, including: obtaining, by a terminal, a charging type of each of at least one AP, where the AP charging type includes a traffic-free AP and a traffic-charged AP; and displaying, by the terminal, an AP list on an AP connection interface, where the AP list includes the charging type of each AP.

According to the AP list display method provided in this embodiment of this application, the charging type of each AP is displayed on the AP connection interface of the terminal, so that a user can visually select an AP for connection with reference to an AP type as required, thereby improving use experience of the user of the terminal.

With reference to the second aspect, in a possible implementation, after the displaying, by the terminal, an AP list on an AP connection interface, the AP list display method provided in this application may further include: receiving, by the terminal, a connection request entered by a user, where the connection request includes a to-be-connected AP selected by the user based on the AP charging type; and connecting, by the terminal, to the to-be-connected AP selected by the user, so as to meet a requirement of the user.

With reference to the second aspect or the foregoing possible implementation, in a possible implementation, the AP charging type may further include an AP with an unknown charging mode. A charging mode of the AP with an unknown charging mode is not explicitly indicated. Therefore, the AP with an unknown charging mode may be a traffic-charged AP or a traffic-free AP.

According to a third aspect, an AP connection method is provided, including: sending, by an AP, a charging type indication to a terminal in a coverage area, where the charging type indication is used to indicate a charging type of the AP, so that the terminal selects an AP for connection based on an AP charging type and an AP connection priority. The AP charging type includes a traffic-free AP and a traffic-charged AP, and a connection priority of the traffic-free AP is higher than that of the traffic-charged AP.

According to the AP connection method provided in this embodiment of this application, the AP sends the charging type indication to the terminal in the coverage area, and the terminal may obtain the charging type of each AP, and preferentially selects the traffic-free AP for automatic connection. In this way, when the terminal used by a user moves to a location at which the traffic-free AP is deployed, regardless of whether an AP to which the terminal is previously connected is charged based on traffic, in the solution in this embodiment of this application, the terminal switches to the traffic-free AP, thereby reducing traffic consumption and traffic fees incurred when the user uses the terminal. In this solution, the terminal operates automatically without user participation, thereby improving user experience.

With reference to the third aspect, in a possible implementation, a specific implementation solution of sending, by an AP, a charging type indication to a terminal in a coverage area is provided and may include: receiving, by the AP, a scan request sent by the terminal, and sending a scan response packet to the terminal that sends the scan request, where the scan response packet includes an indication field indicating the AP charging type, and the indication field is a charging type indication. A current scan response mechanism used for connecting to the AP is also considered. In the scan response packet, the AP charging type is indicated by using the indication field, and therefore, an implementation solution is simple and communication resources are saved.

With reference to the third aspect or the foregoing possible implementation, in a possible implementation, the scan response packet is a probe response packet (Probe response, Probe rsp), and the indication field is an extension field of a vendor specific vendor specific field of the probe response packet.

With reference to the third aspect or any one of the foregoing possible implementations, in a possible implementation, another specific implementation solution of sending, by an AP, a charging type indication to a terminal in a coverage area is provided and may include: sending, by the AP, a broadcast message that includes an indication field indicating the AP charging type, where the indication field is a charging type indication. The terminal in the coverage area receives the broadcast message, to be specific, obtains the charging type indicated by the indication field in the broadcast message. The indication field indicating the AP charging type is sent by using the broadcast message, and the current scan response mechanism used for connecting to the AP does not need to be modified, thereby ensuring security of a scan connection mechanism and reducing a connection failure risk.

With reference to the third aspect or any one of the foregoing possible implementations, in a possible implementation, the AP charging type is an attribute default value of the AP, or the AP charging type is a value entered by a user. Specifically, the AP charging type is configured at an AP end.

According to a fourth aspect, a terminal is provided, including a processor and a memory, where the memory is configured to store a computer executable instruction, and when the terminal runs, the processor invokes the computer executable instruction stored in the memory to perform the following steps: obtaining a charging type of each of at least one AP, where the AP charging type includes a traffic-free AP and a traffic-charged AP; and selecting an AP for connection based on the charging type of each of the at least one AP and an AP connection priority, where a connection priority of the traffic-free AP is higher than that of the traffic-charged AP.

With reference to the fourth aspect, in a possible implementation, the processor may be specifically configured to: perform AP scanning, and receive a scan response packet sent by each of the at least one AP, where the scan response packet includes an indication field indicating the charging type of the sender AP; and obtain the charging type indicated by the indication field in the scan response packet sent by each of the at least one AP.

With reference to the fourth aspect or the foregoing possible implementation, in a possible implementation, the processor is specifically configured to: receive a broadcast message sent by each of the at least one AP, where the broadcast message includes an indication field indicating the charging type of the sender AP; and obtain the charging type indicated by the indication field in the broadcast message sent by each of the at least one AP.

With reference to the fourth aspect or any one of the foregoing possible implementations, in a possible implementation, the AP charging type further includes an AP with an unknown charging mode; AP connection priorities in descending order are successively: the traffic-free AP, the AP with an unknown charging mode, and the traffic-charged AP; and the processor is specifically configured to: if a traffic-free AP exists in the at least one AP, select the traffic-free AP for connection; if a traffic-free AP does not exist but an AP with an unknown charging mode exists in the at least one AP, select the AP with an unknown charging mode for connection; or if neither a traffic-free AP nor an AP with an unknown charging mode exists but a traffic-charged AP exists in the at least one AP, select the traffic-charged AP for connection.

With reference to the fourth aspect or any one of the foregoing possible implementations, in a possible implementation, the processor is specifically configured to: if a traffic-free AP exists in the at least one AP, select the traffic-free AP for connection; or if a traffic-free AP does not exist but a traffic-charged AP exists in the at least one AP, select the traffic-charged AP for connection.

With reference to the fourth aspect or any one of the foregoing possible implementations, in a possible implementation, the selecting, by the processor, the traffic-free AP for connection includes: if the terminal is connected to the traffic-free AP, keeping the connection unchanged; or if the terminal is connected to the traffic-charged AP, or is connected to the AP with an unknown charging mode, or is not connected to any AP, selecting a traffic-free AP from the at least one AP for connection.

With reference to the fourth aspect or any one of the foregoing possible implementations, in a possible implementation, the terminal further includes a display unit, and the processor is specifically configured to: after obtaining the charging type of each of the at least one AP, display the charging type of each AP by using the display unit on an AP connection interface of the terminal; receive a connection request entered by a user of the terminal, where the connection request includes a to-be-connected AP selected by the user based on the AP connection priority; and connect to the AP indicated by the connection request.

With reference to the fourth aspect or any one of the foregoing possible implementations, in a possible implementation, the AP charging type is an attribute default value of the AP, or the AP charging type is a value entered by a user.

It should be noted that a specific implementation of the third aspect is the same as that of the first aspect and can achieve a same beneficial effect as the first aspect. Details are not described herein again.

According to a fifth aspect, another terminal is provided, including an obtaining unit, a selection unit, and a connection unit, where the obtaining unit is configured to obtain a charging type of each of at least one AP, where the AP charging type includes a traffic-free AP and a traffic-charged AP; the selection unit is configured to select an AP based on the charging type of each of the at least one AP obtained by the obtaining unit and an AP connection priority, where a connection priority of the traffic-free AP is higher than that of the traffic-charged AP; and the connection unit is configured to connect to the AP selected by a selection unit.

With reference to the fifth aspect, in a possible implementation, the obtaining unit is specifically configured to: perform AP scanning, and receive a scan response packet sent by each of the at least one AP, where the scan response packet includes an indication field indicating the charging type of the sender AP; and obtain the charging type indicated by the indication field in the scan response packet sent by each of the at least one AP.

With reference to the fifth aspect or the foregoing possible implementation, in a possible implementation, the obtaining unit is specifically configured to: receive a broadcast message sent by each of the at least one AP, where the broadcast message includes an indication field indicating the charging type of the sender AP; and obtain the charging type indicated by the indication field in the broadcast message sent by each of the at least one AP.

With reference to the fifth aspect or any one of the foregoing possible implementations, in a possible implementation, the AP charging type further includes an AP with an unknown charging mode; AP connection priorities in descending order are successively: the traffic-free AP, the AP with an unknown charging mode, and the traffic-charged AP; and the selection unit is specifically configured to: if a traffic-free AP exists in the at least one AP, select the traffic-free AP for connection; if a traffic-free AP does not exist but an AP with an unknown charging mode exists in the at least one AP, select the AP with an unknown charging mode for connection; or if neither a traffic-free AP nor an AP with an unknown charging mode exists but a traffic-charged AP exists in the at least one AP, select the traffic-charged AP for connection.

With reference to the fifth aspect or any one of the foregoing possible implementations, in a possible implementation, when the AP charging type includes the traffic-free AP and the traffic-charged AP, the selection unit is specifically configured to: if a traffic-free AP exists in the at least one AP, select the traffic-free AP for connection; or if a traffic-free AP does not exist but a traffic-charged AP exists in the at least one AP, select the traffic-charged AP for connection.

With reference to the fifth aspect or any one of the foregoing possible implementations, in a possible implementation, the selecting, by the selection unit, the traffic-free AP for connection is specifically implemented as follows: if the terminal is connected to the traffic-free AP, keeping the connection unchanged; or if the terminal is connected to the traffic-charged AP, or is connected to the AP with an unknown charging mode, or is not connected to any AP, selecting a traffic-free AP from the at least one AP for connection.

With reference to the fifth aspect or any one of the foregoing possible implementations, in a possible implementation, the terminal further includes a display unit, configured to: after the obtaining unit obtains the charging type of each of the at least one AP, display the charging type of each AP on an AP connection interface; and the selection unit is specifically configured to: receive a connection request entered by a user of the terminal, where the connection request includes the to-be-connected AP that is selected by the user based on the AP connection priority; and select the AP indicated by the connection request for connection.

With reference to the fifth aspect or any one of the foregoing possible implementations, in a possible implementation, the AP charging type is an attribute default value of the AP, or the AP charging type is a value entered by a user.

It should be noted that a specific implementation of the fourth aspect is the same as that of the first aspect and can achieve a same beneficial effect as the first aspect. Details are not described herein again.

According to a sixth aspect, a terminal is provided, including a processor, a memory, and a display unit, where the memory is configured to store a computer executable instruction, and when the terminal runs, the processor invokes the computer executable instruction stored in the memory to perform the following steps: obtaining a charging type of each of at least one AP, where the AP charging type includes a traffic-free AP and a traffic-charged AP; and displaying an AP list on an AP connection interface by using the display unit, where the AP list includes the charging type of each AP.

According to a seventh aspect, a terminal is provided, including an obtaining unit and a display unit, where the obtaining unit is configured to obtain a charging type of each of at least one AP, where the AP charging type includes a traffic-free AP and a traffic-charged AP; and the display unit is configured to display an AP list on an AP connection interface, where the AP list includes the charging type of each AP.

It should be noted that the terminal provided in the sixth aspect or the seventh aspect is configured to implement the AP list display method provided in the second aspect, and a specific implementation of the sixth aspect or the seventh aspect is the same as that of the second aspect, and therefore can achieve a same beneficial effect as the second aspect. Details are not described herein again.

According to an eighth aspect, an embodiment of this application provides an AP; the AP may implement functions in the method examples, and the functions may be implemented by hardware, or may be implemented by hardware by executing corresponding software; and the hardware or the software includes one or more modules corresponding to the functions.

With reference to the eighth aspect, in a possible implementation, a structure of the AP includes a processor and a transceiver, where the processor is configured to support the AP in performing the corresponding functions in the method; the transceiver is configured to support the AP in communicating with another device; and the AP may further include a memory, and the memory is configured to be coupled with the processor, and the memory stores a program instruction and data required by the AP.

According to a ninth aspect, an embodiment of this application provides a computer storage medium, configured to store a computer software instruction used by the foregoing terminal, and the computer storage medium includes a program designed for executing the foregoing aspects.

According to a tenth aspect, an embodiment of this application provides a computer storage medium, configured to store a computer software instruction used by the foregoing AP, and the computer storage medium includes a program designed for executing the foregoing aspects.

According to an eleventh aspect, an embodiment of this application provides a communications system, including the terminal and the AP described in at least one of the foregoing aspects.

The solution provided in the fifth aspect or the seventh aspect is used to implement the AP connection method provided in the first aspect or the second aspect, and therefore can achieve a beneficial effect the same as that of the first aspect or the second aspect. Details are not described herein again.

BRIEF DESCRIPTION OF DRAWINGS

FIG. 5-1 and FIG. 5-2 are a schematic flowchart of a method for selecting an AP for connection according to an embodiment of this application;

DESCRIPTION OF EMBODIMENTS

Figure 1:
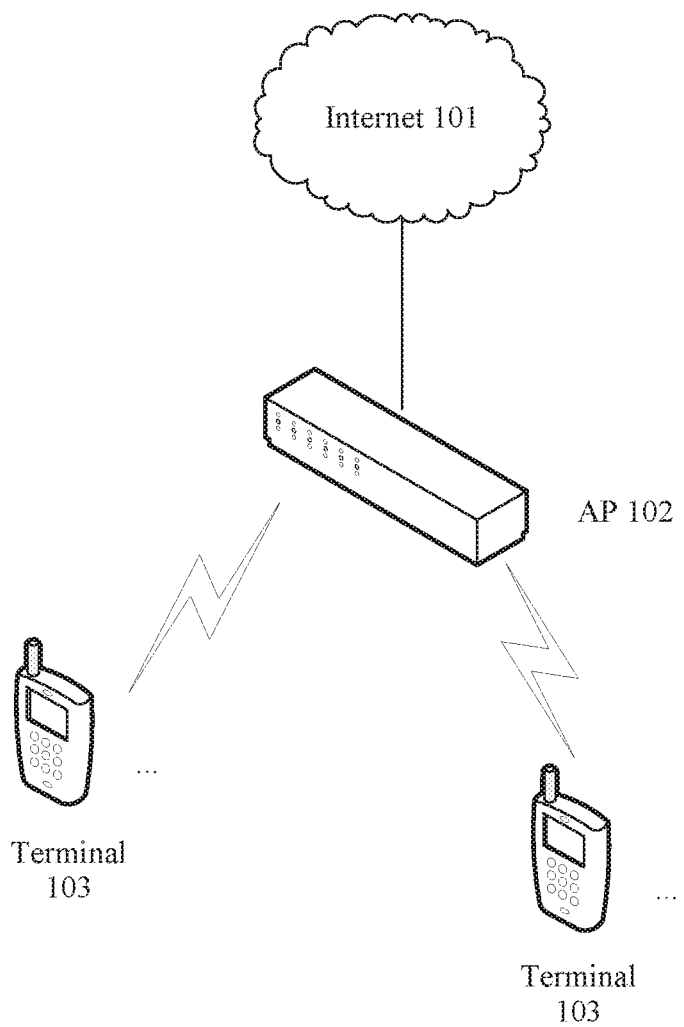
FIG. 1 is a schematic diagram of a wireless network architecture in the prior art.

Currently, in the wireless communications field, when a terminal is connected to an AP to access the Internet, a user of the terminal selects the AP to which the terminal is connected or switches from one AP to another AP for connection. The AP is classified into a traffic-charged AP and a traffic-free AP. In some scenarios without a traffic-free AP, after the terminal is connected to a traffic-charged AP according to a user's operation, when the terminal moves to a location at which a traffic-free AP exists, the terminal may always be connected to the traffic-charged AP because the user forgets to switch. Consequently, the terminal is always connected to the traffic-charged AP, and a large quantity of communication fees are incurred for using the traffic-charged AP for a long time.

Based on this, a basic principle of this application is as follows: The terminal first obtains a charging type of each AP, and then selects an AP for automatic connection based on the AP charging type and an AP connection priority, so that the terminal is preferentially connected to a traffic-free AP in an environment of the terminal. This avoids that a large quantity of communication fees incurred because the terminal is connected to a traffic-charged AP in a scenario in which a traffic-free AP exists, so as to improve experience of a user of the terminal.

It should be noted that the terminal described in this application is a mobile communications device used by the user. The terminal may be a mobile phone, a tablet computer, a notebook computer, an ultra-mobile personal computer (Ultra-mobile Personal Computer, UMPC), a netbook, a personal digital assistant (Personal Digital Assistant, PDA), a netbook, a mobile television, a wearable device, a personal computer (Personal Computer, PC), or the like. A type of the terminal is not specifically limited in the embodiments of this application either.

Further, the AP described in this application is a device that provides data access for the terminal. The AP includes but is not limited to a wireless router, a bridge, a terminal with a hotspot function, and the like. A type of the AP is not specifically limited in the embodiments of this application either. Any device, in a wireless network, that is configured to provide data access for another device may be understood as the AP described in the embodiments of this application. It should be noted that the device that provides data access for the user has different names in different networks, and any device that provides data access in a wireless network is the AP in this application.

It should be further noted that the wireless network in this application may be a Long Term Evolution (Long Term Evolution. LTE) network, a Universal Mobile Telecommunications System (Universal Mobile Telecommunications System, UMTS) network, or another wireless network. A type of a wireless network to which a solution of this application is applied is not specifically limited in the embodiments of this application.

An AP connection method provided in this application is applied to a wireless network architecture shown in FIG. 1. As shown in FIG. 1, the wireless network architecture includes an Internet 101 providing data access, at least one AP 102 that provides data access for a terminal to access the Internet, and the terminal 103 that accesses the Internet 101 by connecting to the AP 102 by using a radio signal generated by the AP 102. Each AP 102 provides network data access for at least one terminal 103.

It should be noted that FIG. 1 is merely a schematic diagram of the wireless network architecture by using an example. A quantity of APs, an AP type, a quantity of terminals connected to the AP, a terminal type, and the like in the wireless network architecture may be all configured based on an actual requirement, and FIG. 1 does not impose a limitation.

Figure 2:
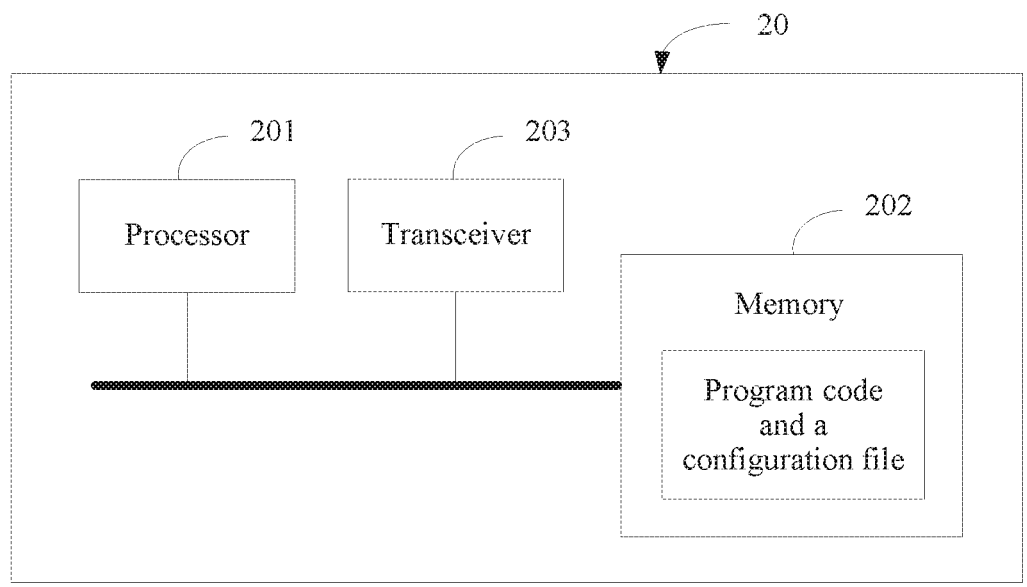
FIG. 2 is a schematic structural diagram of a terminal according to an embodiment of this application.

FIG. 2 shows a terminal 20 related to the embodiments of this application. The terminal 20 may be the terminal 103 in the wireless network architecture shown in FIG. 1. As shown in FIG. 2, the terminal 20 may include a processor 201, a memory 202, and a transceiver 203.

The following describes all constituent components of the terminal 20 in detail with reference to FIG. 2.

The memory 202 may be a volatile memory (volatile memory), for example, a random access memory (random-access memory, RAM); or a non-volatile memory (non-volatile memory), for example, a read-only memory (read-only memory, ROM), a flash memory (flash memory), a hard disk (hard disk drive, HDD), or a solid-state drive (solid-state drive, SSD); or a combination of the foregoing types of memories. The memory 202 is configured to store program code and a configuration file that can implement a method in this application.

As a control center of the terminal 20, the processor 201 may be a central processing unit (central processing unit, CPU), or an application-specific integrated circuit (Application Specific Integrated Circuit, ASIC), or one or more integrated circuits that are configured to implement the embodiments of this application, such as one or more microprocessors (digital singnal processor, DSP), or one or more field programmable gate arrays (Field Programmable Gate Array, FPGA). The processor 201 may run or execute a software program and/or a module stored in the memory 202, and invoke data stored in the memory 202, to perform various functions of the terminal 20.

The transceiver 203 is configured for interaction between the terminal 20 and another unit. For example, the transceiver 203 may be a transceiver antenna of the terminal.

In a possible implementation, the processor 201 runs or executes the software program and/or the module stored in the memory 202, and invokes the data stored in the memory 202, to perform the following functions:

obtaining, by the transceiver 203, a charging type of each of at least one AP, where the AP charging type includes a traffic-free AP and a traffic-charged AP;

selecting an AP for connection based on the charging type of each of the at least one AP and an AP connection priority, where a connection priority of the traffic-free AP is higher than that of the traffic-charged AP.

Figure 2A:
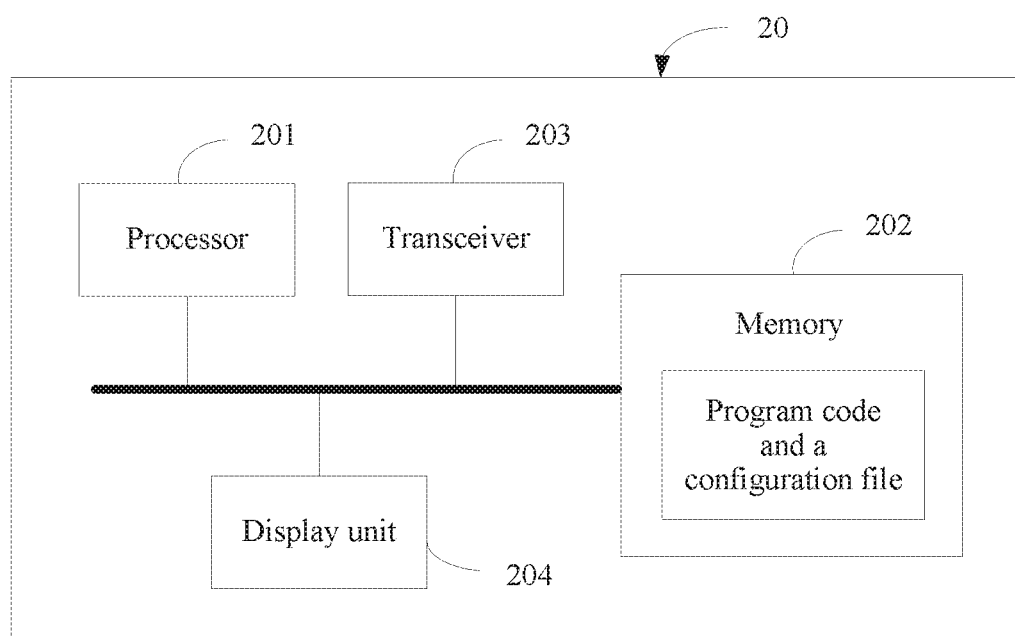
FIG. 2a is a schematic structural diagram of another terminal according to an embodiment of this application.

In another possible implementation, as shown in FIG. 2a, the terminal 20 may further include a display unit 204. The processor 201 runs or executes the software program and/or the module stored in the memory 202, and invokes the data stored in the memory 202, to perform the following functions:

obtaining, by the transceiver 203, a charging type of each of at least one AP, where the AP charging type includes a traffic-free AP and a traffic-charged AP; and displaying, by the display unit 204, an AP list on an AP connection interface, where the AP list includes the charging type of each AP.

Figure 3:
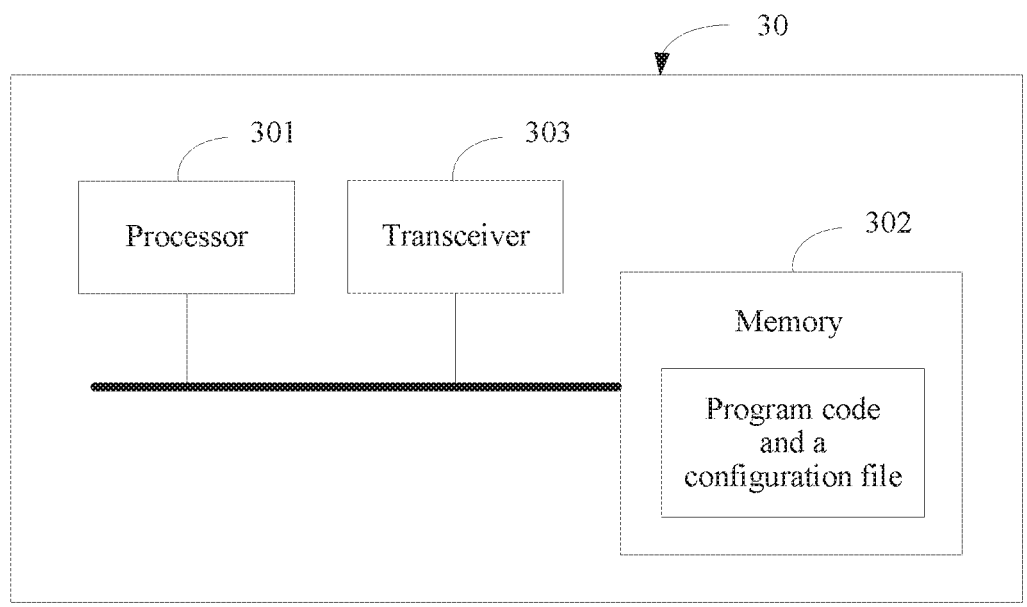
FIG. 3 is a schematic structural diagram of an AP according to an embodiment of this application.

FIG. 3 shows an AP 30 related to the embodiments of this application. The AP 30 may be the AP 102 in the wireless network architecture shown in FIG. 1. As shown in FIG. 3, the AP 30 may include a processor 301, a memory 302, and a transceiver 303.

The following describes all constituent components of the AP 30 in detail with reference to FIG. 3.

The memory 302 may be a volatile memory, for example, a RAM; or a non-volatile memory, for example, a ROM, a flash memory, an HDD, or an SSD; or a combination of the foregoing types of memories. The memory 302 is configured to store program code and a configuration file that can implement a method in this application.

As a control center of the AP 30, the processor 301 may be a CPU, or an ASIC, or one or more integrated circuits configured to implement the embodiments of this application, such as one or more DSPs or one or more FPGAs. The processor 301 may run or execute a software program and/or a module stored in the memory 302, and invoke data stored in the memory 302, to perform various functions of the AP 30.

The transceiver 303 is configured for interaction between the AP 30 and another unit. For example, the transceiver 303 may be a transceiver antenna of the AP 30.

Specifically, the processor 301 runs or executes the software program and/or the module stored in the memory 302, and invokes the data stored in the memory 302, to perform the following functions:

sending, by the transceiver 303, a charging type indication to a terminal in a coverage area, where the charging type indication is used to indicate a charging type of the AP, so that the terminal selects an AP for connection based on an AP charging type and an AP connection priority. The AP charging type includes a traffic-free AP and a traffic-charged AP, and a connection priority of the traffic-free AP is higher than that of the traffic-charged AP.

The following describes the embodiments of this application in detail with reference to the accompanying drawings.

Figure 4:
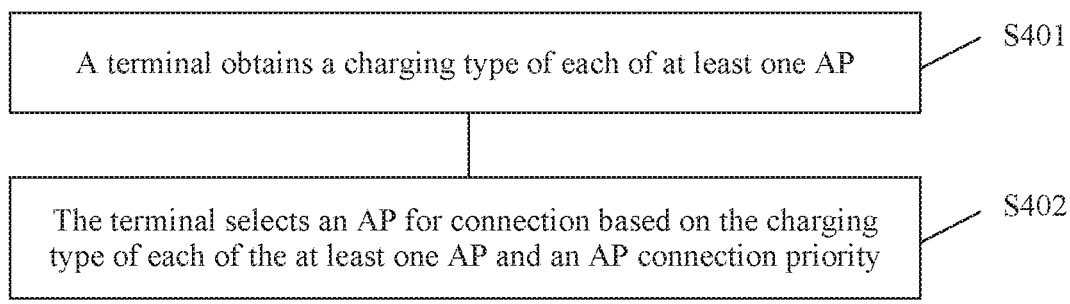
FIG. 4 is a schematic flowchart of an AP connection method according to an embodiment of this application.

According to one aspect, an embodiment of this application provides an AP connection method applied to a terminal. As shown in FIG. 4, the method may include the following steps.

S401. The terminal obtains a charging type of each of at least one AP.

The AP charging type includes a traffic-free AP and a traffic-charged AP.

Optionally, there is an AP whose charging type is not explicitly indicated in a network, and the AP whose charging type is not explicitly indicated is defined as an AP with an unknown charging mode. Therefore, the AP charging type may further include the AP with an unknown charging mode.

Further, the AP charging type may be indicated by using an indication field, and different field content is defined to indicate different indication content. Optionally, for an indication field corresponding to the AP with an unknown charging mode, fixed content may be predefined to indicate the AP with an unknown charging mode, or the indication field may be empty for indicating the AP with an unknown charging mode, or a location of the indication field defined in a packet is empty for indicating the AP with an unknown charging mode.

For example, it is assumed that content of the indication field is predefined as 1 to indicate that the AP charging type is the traffic-free AP; the content of the indication field is predefined as 0 to indicate that the AP charging type is the traffic-charged AP; and the content of the indication field is predefined as empty or no indication field is predefined, to indicate that the AP charging type is the AP with an unknown charging mode.

Specifically, a configuration location of the indication field during actual communication may be configured based on an actual requirement. The indication field used by a user to indicate the AP charging type may be configured in a message used for communication between the AP and the terminal; and a type of the message in which the indication field is configured is not specifically limited in this embodiment of this application. Certainly, a specific location of the indication field in the message is not specifically limited in this embodiment of this application either.

The following provides two methods used by the terminal to obtain the charging type of each of the at least one AP, but does not specifically limit an implementation process of the S401 in this embodiment of this application.

Optionally, methods used by the terminal to obtain the charging type of each of the at least one AP may specifically include but are not limited to the following two methods.

Method 1: The terminal performs AP scanning, and receives a scan response packet sent by each of the at least one AP, where the scan response packet includes an indication field indicating the charging type of the sender AP; and the terminal obtains the charging type indicated by the indication field in the scan response packet sent by each of the at least one AP.

In Method 1, after the terminal initiates AP scanning, each AP receives a scan request, and each AP feeds back the scan response packet to the terminal, where the packet carries the indication field indicating the charging type of the sender AP. In this way, the terminal receives the scan response packet that is fed back by each AP and that includes the charging type indication field of each AP, and based on a preset correspondence between the content of the indication field and the charging type, the terminal can obtain the charging type of each AP based on the content of the indication field.

It should be noted that, in actual communication, both a specific location of the indication field and the correspondence between the content of the indication field and the AP charging type are predefined content, and the predefined content is known to all devices in the network.

For example, the scan response packet, namely, a probe response packet, is a response packet sent by the AP in response to the scanning request from the terminal. The indication field in the probe response packet may be a vendor specific field, and is usually defined as an extension field of a vendor specific field. It should be noted that the vendor-specific field may be configured based on an actual requirement, and needs to be known to only two communication parties.

For example, the vendor specific field of the probe response packet sent by the AP is extended, and a charge field is added as the charging type indication field.

Method 2: The terminal receives a broadcast message sent by each of the at least one AP, where the broadcast message includes an indication field indicating the charging type of the sender AP; and the terminal obtains the charging type indicated by the indication field in the broadcast message sent by each of the at least one AP.

For example, the broadcast message may include a beacon frame.

In Method 2, the indication field is configured in the broadcast message, and a specific performing process of Method 2 is the same as that of Method 1, and details are not described herein again.

Further, when the AP determines the content of the indication field, the AP charging type indicated by the indication field may be an attribute default value of the AP, or the AP charging type indicated by the indication field may be a value entered by a user of the AP.

The AP charging type in the attribute default value of the AP is an AP charging mode determined by an operation manner of the AP. For example, a router is generally connected to a monthly-package home broadband network and is a traffic-free AP. Therefore, an AP charging type in an AP attribute default value of the router is a traffic-free AP. When serving as an access point, a mobile phone is connected to an operator network, consumes data traffic of a user, and is a traffic-charged AP. Therefore, an AP charging type in an AP attribute default value of the mobile phone is a traffic-charged AP.

Further, to better meet a personal requirement of a user, the AP charging type may be configured by the user instead of being a default value. To be specific, the AP type indicated by the indication field is the value entered by the user of the AP. On an AP configuration interface, for example, a configuration page of the router or a hotspot function setting interface of the mobile phone, charging type options are set for selection by the user. When the user selects one of the charging types, the charging type selected by the user is a charging type of an AP operated by the user.

Further, optionally, when the charging type options are set on the AP configuration interface, content of each option in the charging type options may be described, so that an AP operation user can accurately configure an AP charging type based on a personal requirement. For example, an option "traffic-free AP" is described as follows: this is an access point whose traffic consumption does not need to be cared; an option "traffic-charged AP" is described as follows: this is an access point charged based on traffic; and an option "AP with an unknown charging mode" is described as: the AP type is hidden.

It should be noted that the charging type options may be set on the AP configuration interface in a drop-down list manner, a check box manner, or another selective configuration manner. This is not specifically limited in this embodiment of this application.

After S401, the terminal obtains a charging type of each AP to which the terminal can be connected, and next, S402 is performed to select a proper AP for connection.

S402. The terminal selects an AP for connection based on the charging type of each of the at least one AP and an AP connection priority.

Specifically, in S402, the terminal may select an AP with a highest connection priority for connection in descending order of predefined AP connection priorities.

Optionally, when the AP charging type includes the traffic-free AP and the traffic-charged AP, a connection priority of the traffic-free AP is higher than that of the traffic-charged AP.

Optionally, when the AP charging type includes the traffic-free AP, the traffic-charged AP network device, and the AP with an unknown charging mode, AP connection priorities in descending order are successively: the traffic-free AP, the AP with an unknown charging mode, and the traffic-charged AP. It should be noted that a charging mode of the AP with an unknown charging mode is inexplicit, but may be free, and therefore, a connection priority of the AP with an unknown charging mode is higher than that of the traffic-charged AP.

It should be noted that the descending order of AP connection priorities may be set based on an actual requirement to meet different service requirements. This is not specifically limited in this embodiment of this application.

The following describes several specific implementation processes of S402, which may specifically include but are not limited to the following three implementation processes:

Implementation process 1: When the AP charging type includes the traffic-free AP, the traffic-charged AP, and the AP with an unknown charging mode, S402 may be specifically implemented as follows:

If a traffic-free AP exists in the at least one AP, the traffic-free AP is selected for connection; if a traffic-free AP does not exist but an AP with an unknown charging mode exists in the at least one AP, the AP with an unknown charging mode is selected for connection; or if neither a traffic-free AP nor an AP with an unknown charging mode exists but a traffic-charged AP exists in the at least one AP, the traffic-charged AP is selected for connection.

Implementation process 2: When the AP charging type includes only the traffic-free AP and the traffic-charged AP, S402 may be specifically implemented as follows:

If a traffic-free AP exists in the at least one AP, the traffic-free AP is selected for connection; or if a traffic-free AP does not exist but a traffic-charged AP exists in the at least one AP, the traffic-charged AP is selected for connection.

Further, in the implementation process 1 and the implementation process 2, processes of selecting an AP of a charging type for connection by the terminal are different depending on whether the terminal is currently connected to an AP and a charging type of a connected AP. This is described in detail below.

Specifically, a process in which the terminal selects the traffic-free AP for connection may specifically include: if the terminal is connected to the traffic-free AP, keeping the connection unchanged; or if the terminal is connected to the traffic-charged AP, or is connected to the AP with an unknown charging mode, or is not connected to any AP, selecting a charge-free AP from the at least one AP for connection.

Specifically, a process in which the terminal selects the AP with an unknown charging mode for connection may specifically include: if the terminal is connected to the AP with an unknown charging mode, keeping the connection unchanged; or if the terminal is connected to the traffic-charged AP or is not connected to any AP, selecting an AP with an unknown charging mode from the at least one AP for connection.

Specifically, a process in which the terminal selects the traffic-charged AP for connection may specifically include: if the terminal is connected to the traffic-charged AP, keeping the connection unchanged; or if the terminal is not connected to any AP, selecting the traffic-charged AP from the at least one AP for connection.

Implementation process 3: The user of the terminal selects a to-be-connected AP. In the implementation process 3, the terminal presents the charging type of each AP to the user of the terminal, and the user selects the to-be-connected AP based on the AP connection priority, and feeds back the selected AP to the terminal.

Figure 4A:
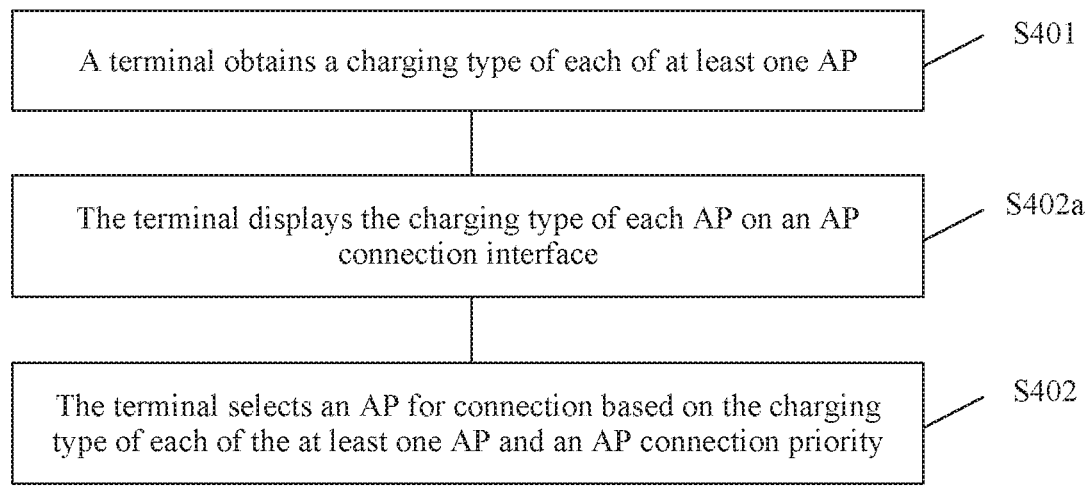
FIG. 4a is a schematic flowchart of another AP connection method according to an embodiment of this application.

Specifically, in the implementation process 3, as shown in FIG. 4a, after S401, the AP connection method provided in this embodiment of this application may further include S402a.

S402a. The terminal displays the charging type of each AP on an AP connection interface.

Figure 4B:
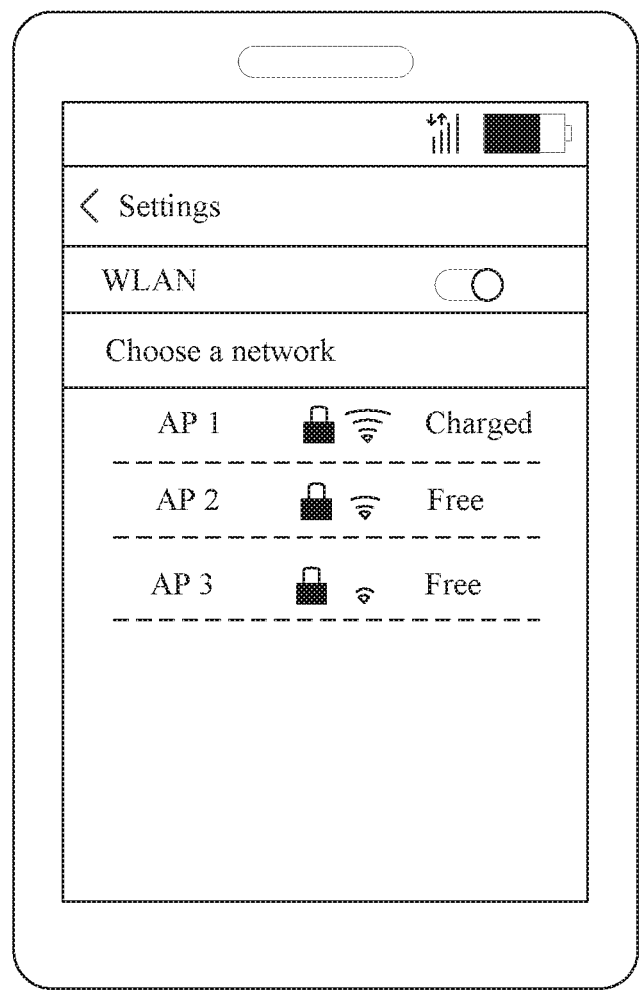
FIG. 4b is a schematic diagram of an AP connection interface on a terminal according to an embodiment of this application.

Optionally, in S402a, the AP connection interface of the terminal may sort and display APs in descending order of signal strengths of all APs and carry the charging type of each AP. The AP connection interface may be shown in FIG. 4b.

Figure 4C:
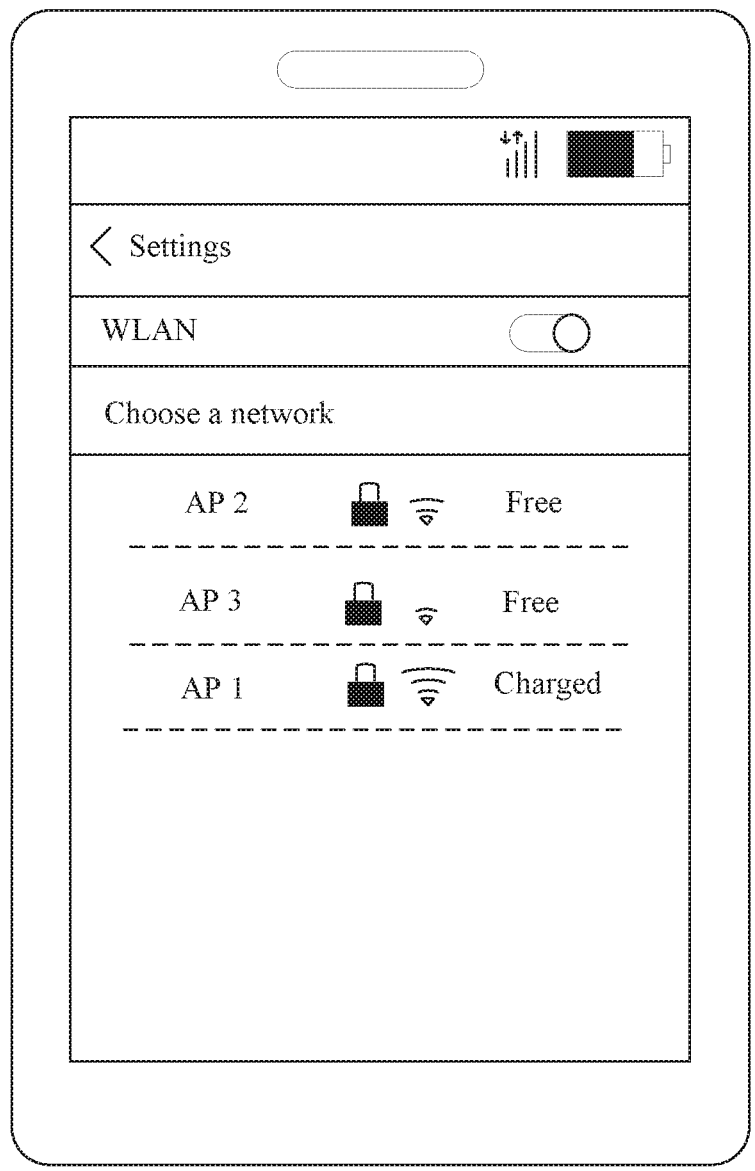
FIG. 4c is a schematic diagram of another AP connection interface on a terminal according to an embodiment of this application.

Optionally, in S402a, the AP connection interface of the terminal may sort and display APs in descending order of AP connection priorities and carry the charging type of each AP. The AP connection interface may be shown in FIG. 4c.

When the AP connection interface of the terminal sorts and displays the APs in descending order of the AP connection priorities, if at least two APs are of a same charging type, the APs may be displayed in any order, or the APs are displayed in descending order of AP signal strengths.

In this case, corresponding to S402a, in the implementation process 3, S402 is specifically implemented as follows: The terminal receives a connection request entered by the user of the terminal, where the connection request includes the to-be-connected AP that is selected by the user based on the AP connection priority, and the terminal is connected to the AP indicated by the connection request.

Figures 1, 5:
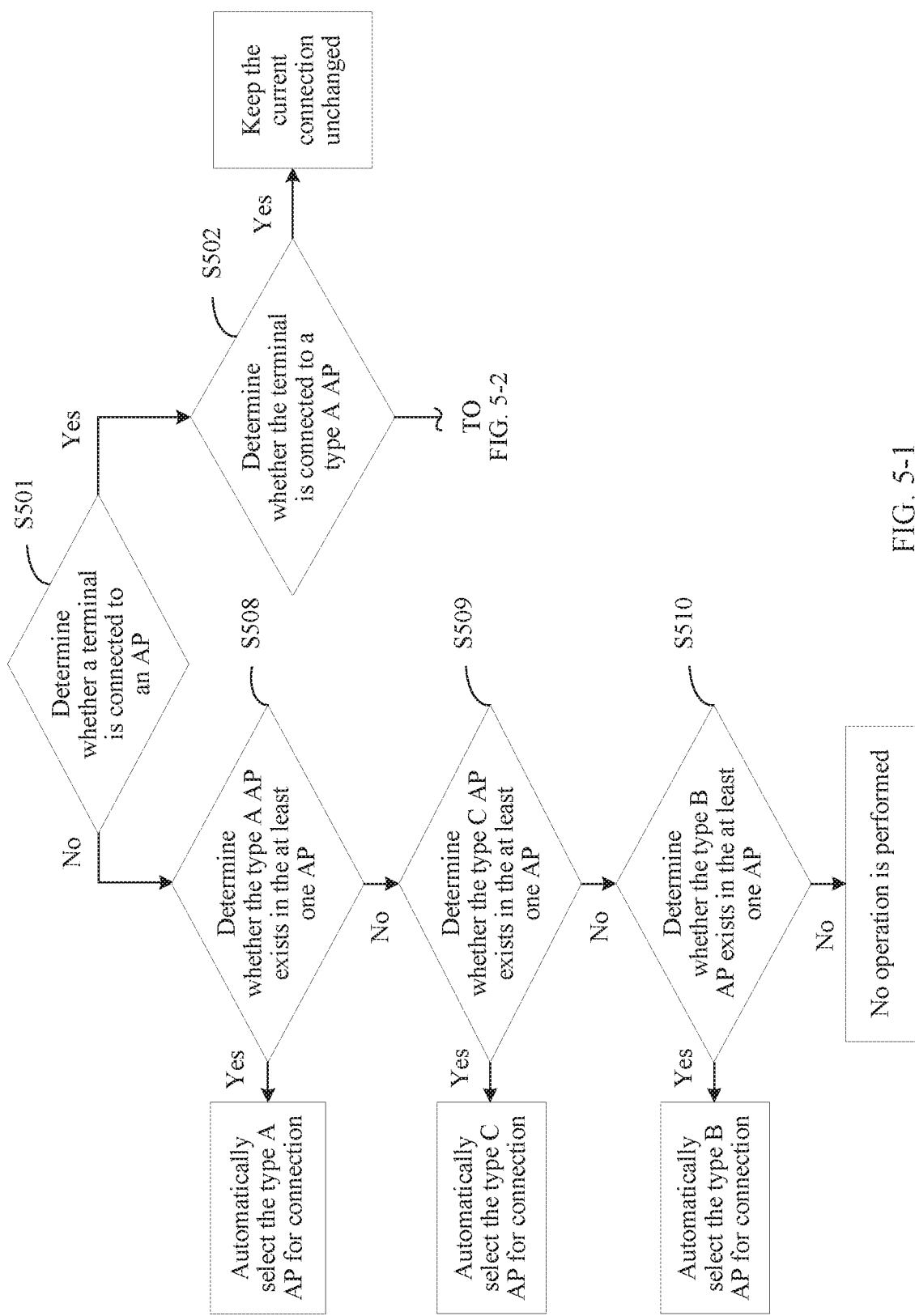
Figures 2, 5:
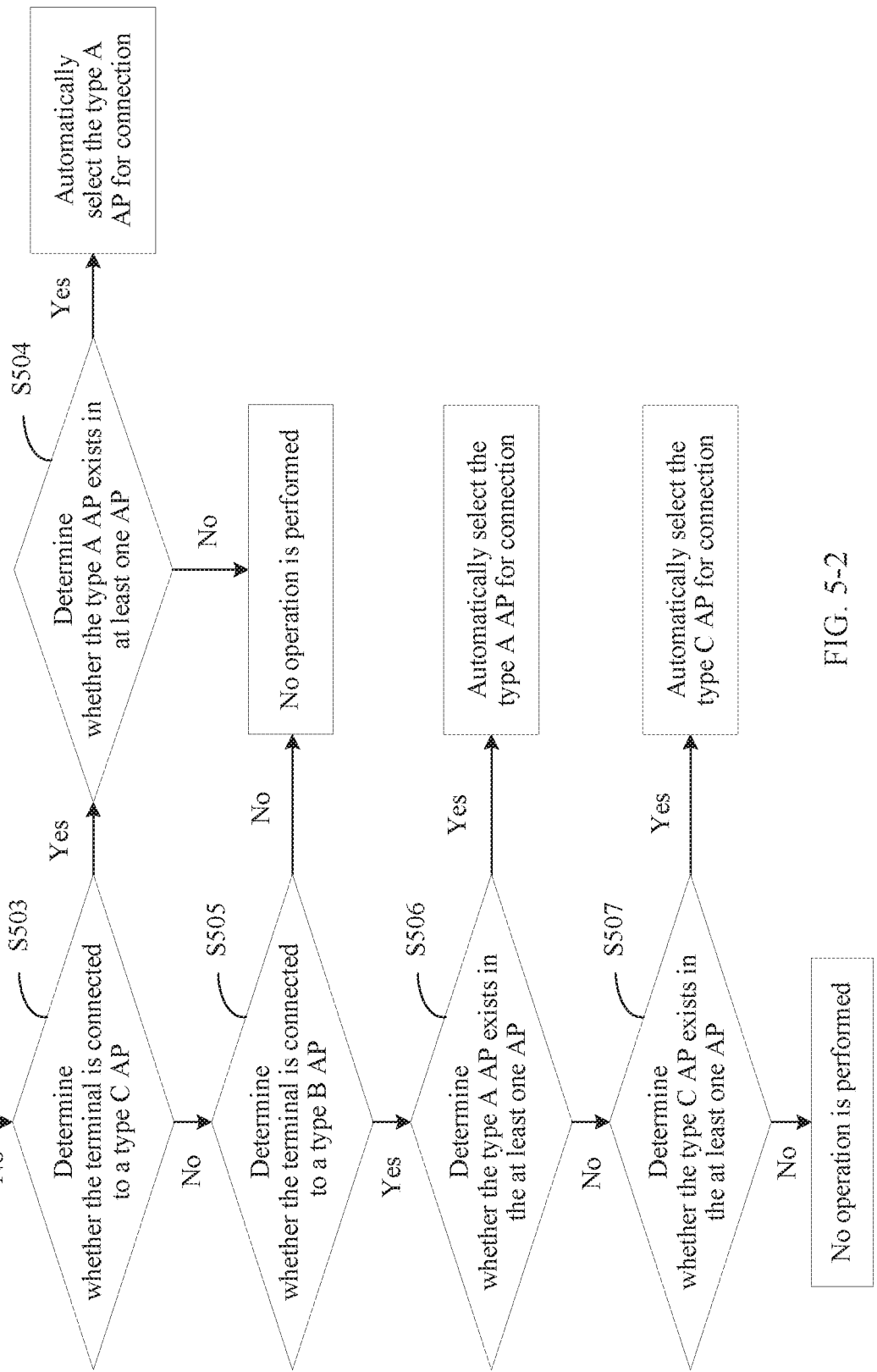

For example, the following describes in detail a complete performing process of S402 by using the implementation process 1. Herein, the traffic-free AP is recorded as a type A AP, the traffic-charged AP is recorded as a type B AP, and the AP with an unknown charging mode is recorded as a type C AP. After the terminal obtains the charging type of each AP in S401, a specific performing process of S402 is shown in FIG. 5-1 and FIG. 5-2. The process may specifically include the following steps.

S501. Determine whether the terminal is connected to an AP.

In S501, if the terminal is connected to an AP, S502 is performed; or if the terminal is not connected to an AP, S508 is performed.

S502. Determine whether the terminal is connected to the type A AP.

In S502, if the terminal is connected to the type A AP, regardless of the charging type of each AP obtained in S401, the current connection remains unchanged; or if the terminal is not connected to the type A AP, S503 is performed.

S503. Determine whether the terminal is connected to the type C AP.

In S503, if the terminal is connected to the type C AP, S504 is performed; or if the terminal is not connected to the type C AP, S505 is performed.

S504. Determine whether the type A AP exists in the at least one AP.

In S504, if the type A AP exists in the at least one AP, the type A AP is automatically selected for connection; or if the type A AP does not exist in the at least one AP, no operation is performed.

S505. Determine whether the terminal is connected to the type B AP.

In S505, if the terminal is connected to the type B AP, S506 is performed; or if the terminal is not connected to the type B AP, no operation is performed.

S506. Determine whether the type A AP exists in the at least one AP.

In S506, if the type A AP exists in the at least one AP, the type A AP is automatically selected for connection; or if the type A AP does not exist in the at least one AP, S507 is performed.

S507. Determine whether the type C AP exists in the at least one AP.

In S507, if the type C AP exists in the at least one AP, the type C AP is automatically selected for connection; or if the type C AP does not exist in the at least one AP, no operation is performed.

S508. Determine whether the type A AP exists in the at least one AP.

In S508, if the type A AP exists in the at least one AP, the type A AP is automatically selected for connection; or if the type A AP does not exist in the at least one AP, S509 is performed.

S509. Determine whether the type C AP exists in the at least one AP.

In S509, if the type C AP exists in the at least one AP, the type C AP is automatically selected for connection; or if the type C AP does not exist in the at least one AP, S510 is performed.

S510. Determine whether the type B AP exists in the at least one AP.

In S510, if the type B AP exists in the at least one AP, the type B AP is automatically selected for connection; or if the type B AP does not exist in the at least one AP, no operation is performed.

The specific performing process of S402 described with reference to FIG. 5-1 and FIG. 5-2 is merely an example used for describing the specific performing process of S402, and is not specifically limited thereto.

It should be noted that when the terminal selects and determines an AP of a charging type for connection based on the charging type of each AP and the AP connection priority, and at least two APs of this charging type exist in the at least one AP, the terminal selects one of the at least two APs of this charging type for connection.

Optionally, when the terminal selects one AP from a plurality of APs of a same charging type in the at least one AP for connection, an AP may be selected randomly, or an AP with a highest signal strength may be selected, or an AP at a closest geographic location is selected, or an AP with highest network security is selected. Certainly, there may be other selection manners, which are not listed one by one in this embodiment of this application.

It should be noted that in the AP connection method provided in this embodiment of this application, S401 and S402 may be performed in real time, or S401 and S402 may be performed periodically. A specific time for performing a solution in this embodiment of this application is not limited, and may be configured based on an actual requirement.

It should be further noted that the selecting an AP for connection described in this embodiment of this application may include: selecting, for connection, an AP whose information is saved by the terminal. In other words, the terminal has been connected to the AP previously, and automatic connection may be implemented. Certainly, the selecting an AP for connection described in this embodiment of this application may alternatively include: selecting, for connection, an AP whose information is not saved by the terminal. In this case, the user of the terminal needs to be prompted to enter information (for example, a connection password) about the AP, and the terminal is connected to the AP after being authenticated.

According to the AP connection method provided in this embodiment of this application, after obtaining the charging type of each AP, the terminal preferentially selects the traffic-free AP for automatic connection. In this way, when the terminal used by the user moves to a location at which the traffic-free AP is deployed, regardless of whether an AP to which the terminal is previously connected is charged based on traffic, in the solution in this embodiment of this application, the terminal switches to the traffic-free AP, thereby reducing traffic consumption and traffic fees incurred when the user uses the terminal. In this solution, the terminal operates automatically without user participation, thereby improving user experience.

Further, optionally, when the terminal selects an AP for connection based on the charging type of each of the at least one AP and the AP connection priority in S402, if the terminal is not connected to any AP currently, S402 is specifically implemented as S4021 and S4022.

S4021. Display reminder information on a screen of the terminal.

The reminder information is used to remind the user of the terminal about a connectable AP.

Optionally, the reminder information may include an identifier of the to-be-connected AP selected by the terminal based on the charging type of each of the at least one AP and the AP connection priority in S402. The user only needs to confirm the reminder information, and the terminal receives a connection instruction. An AP that is selected by the user and that is corresponding to the connection instruction is the AP indicated by the AP identifier included in the reminder information.

Optionally, the reminder information may include an identifier of the to-be-connected AP selected by the terminal based on the charging type of each of the at least one AP and the AP connection priority in S402. For the reminder information, the user may alternatively select an AP that is not indicated by the reminder information for connection, and a connection instruction received by the terminal includes an identifier of an AP selected by the user. The AP that is selected by the user and that is corresponding to the connection instruction is the AP indicated by the AP identifier included in the connection instruction.

Optionally; the reminder information may include an AP list and the charging type of each of the at least one AP obtained by the terminal in S401. For the reminder information, the user selects an AP based on the AP connection priority, and the terminal receives a connection instruction. The AP that is selected by the user and that is corresponding to the connection instruction is the AP that is determined and selected for connection.

The identifier of the AP is used to uniquely determine the AP. The identifier of the AP may be configured based on an actual requirement, and specific content and a form of the identifier of the AP are not specifically limited in this embodiment of this application.

S4022. The terminal receives a connection instruction entered by the user, and is connected to the AP selected by the user.

Figure 5A:
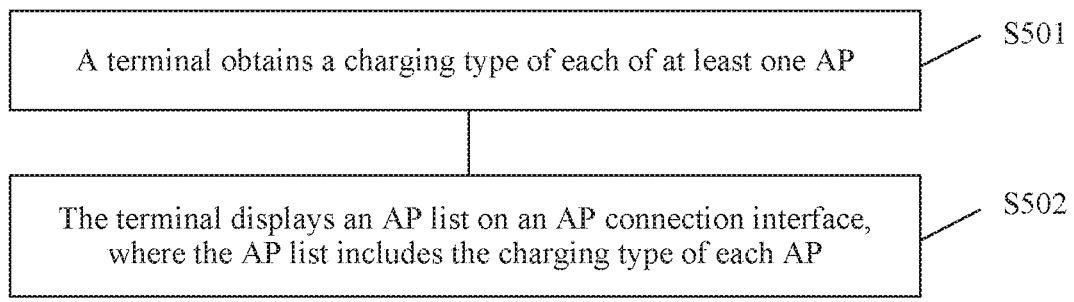
FIG. 5a is a schematic flowchart of an AP list display method according to an embodiment of this application.

According to another aspect, an embodiment of this application provides an AP list display method. As shown in FIG. 5a, the method may include the following steps.

S501. A terminal obtains a charging type of each of at least one AP.

It should be noted that an implementation process of S501 is the same as that of S401. Details are not described herein again.

S502. The terminal displays an AP list on an AP connection interface, where the AP list includes the charging type of each AP.

It should be noted that an implementation process of S502 is the same as that of S402a. Details are not described herein again.

According to the AP list display method provided in this embodiment of this application, the charging type of each AP is displayed on the AP connection interface of the terminal, so that a user can visually select an AP for connection with reference to an AP type as required, thereby improving use experience of the user of the terminal.

Further, after S502, the terminal may receive a connection request entered by the user, where the connection request includes the to-be-connected AP that is selected by the user based on the AP charging type; and the terminal is connected to the to-be-connected AP selected by the user, so as to meet a requirement of the user.

The foregoing has mainly described the solutions provided in the embodiments of this application from a perspective of a working process of the terminal. It may be understood that, to achieve the foregoing functions, the terminal includes a corresponding hardware structure and/or software module for implementing each function. A person skilled in the art should be easily aware that units and algorithm steps in the examples described with reference to the embodiments provided in this specification may be implemented in a form of hardware or in a form of a combination of hardware and computer software in this application. Whether a function is performed by hardware or computer software driving hardware depends on particular applications and design constraint conditions of the technical solutions. A person skilled in the art may use different methods to implement the described functions for each particular application, but it should not be considered that the implementation goes beyond the scope of this application.

In the embodiments of this application, the terminal may be divided into function modules based on the foregoing method examples. For example, each function module may be obtained through division for a corresponding function, or two or more functions may be integrated into one processing module. The integrated module may be implemented in a form of hardware, or may be implemented in a form of a software function module. It should be noted that the module division in this embodiment of this application is an example, and is merely logical function division and may be another division manner during actual implementation.

Figure 6:
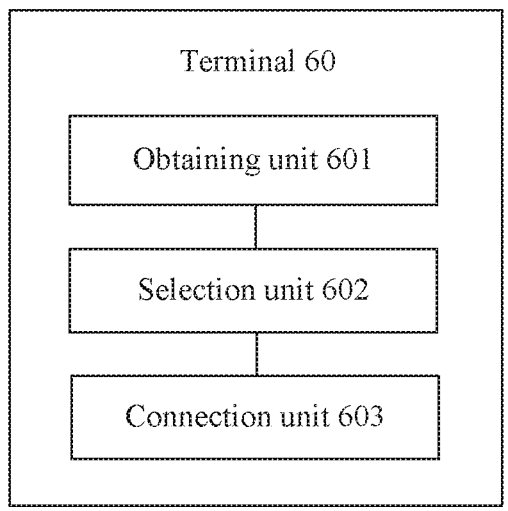
FIG. 6 is a schematic structural diagram of still another terminal according to an embodiment of this application.

When function modules corresponding to various functions are obtained through division, FIG. 6 is a possible schematic structural diagram of the terminal in the foregoing embodiments. The terminal 60 may include an obtaining unit 601, a selection unit 602, and a connection unit 603. The obtaining unit 601 is configured to support the terminal 60 in performing a process S401 in FIG. 4, and the selection unit 602 and the connection unit 603 are configured to support the terminal 60 in performing a process S302 in FIG. 4. The connection unit 603 is configured to support the terminal 60 in performing a process in FIG. 5-1 and FIG. 5-2. All related content of each step in the foregoing method embodiment may be cited in function descriptions of a corresponding function module. Details are not described herein.

Figure 7:
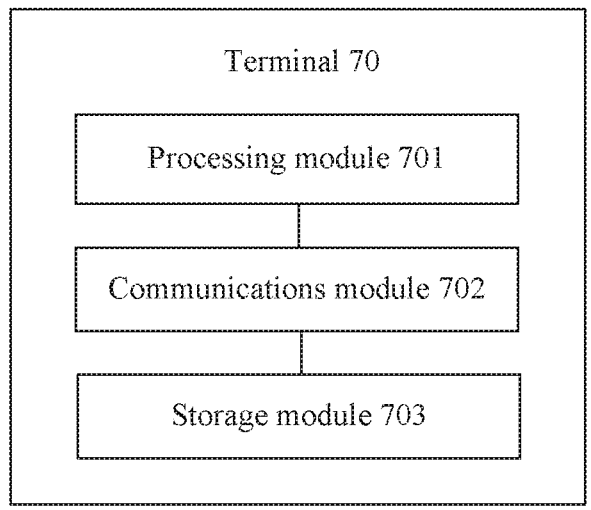
FIG. 7 is a schematic structural diagram of yet another terminal according to an embodiment of this application.

When an integrated unit is used, FIG. 7 is a possible schematic structural diagram of the terminal in the foregoing embodiments. The terminal 70 may include a processing module 701 and a communications module 702. The processing module 701 is configured to control and manage an action of the terminal 70. For example, the processing module 701 is configured to support the terminal 70 in performing processes S401 and S402 in FIG. 4 and all processes in FIG. 5-1 and FIG. 5-2. The communications module 702 is further configured to support the terminal 70 in communicating with another network entity. The terminal 70 may further include a storage module 703, configured to store program code and data of the terminal 70.

The processing module 701 may be the processor 201 in the physical structure of the terminal 20 shown in FIG. 2, and may be a processor or a controller, for example, may be a CPU, a general-purpose processor, a DSP, an ASIC, an FPGA or another programmable logic device, a transistor logic device, a hardware component, or any combination thereof. The processing module 701 may implement or execute various examples of logical blocks, modules, and circuits that are described with reference to content disclosed in this application. Alternatively, the processor 701 may be a combination for implementing a computing function, for example, a combination including one or more microprocessors, a combination of a DSP and a microprocessor, or the like. The communications module 702 may be the transceiver 203 in the physical structure of the terminal 20 shown in FIG. 2. The communications module 702 may be a communications port, or may be a transceiver, a transceiver circuit, a communications interface, or the like. The storage module 703 may be the memory 202 in the physical structure of the terminal 20 shown in FIG. 2.

When the processing module 701 is a processor, the communications module 702 is a transceiver, and the storage module 703 is a memory, the terminal 70 in FIG. 7 in this embodiment of this application may be the terminal 20 shown in FIG. 2.

Figure 8:
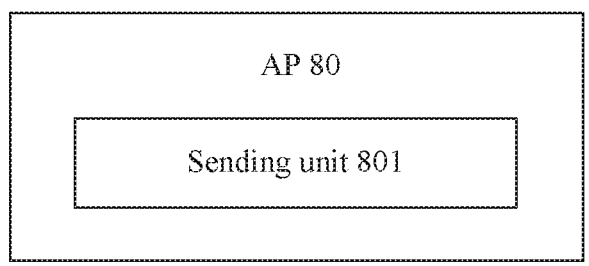
FIG. 8 is a schematic structural diagram of another AP according to an embodiment of this application.

When function modules corresponding to various functions are obtained through division. FIG. 8 is a possible schematic structural diagram of the AP in the foregoing embodiments. The AP 80 may include a sending unit 801. The sending unit 801 is configured to support the AP 80 in sending a charging type indication to a terminal in a coverage area, where the charging type indication is used to indicate a charging type of the AP, so that the terminal selects an AP for connection based on a charging type of an AP and an AP connection priority. The AP charging type includes a traffic-free AP and a traffic-charged AP, and a connection priority of the traffic-free AP is higher than that of the traffic-charged AP. All related content of each step in the foregoing method embodiment may be cited in function descriptions of a corresponding function module. Details are not described herein.

Figure 9:
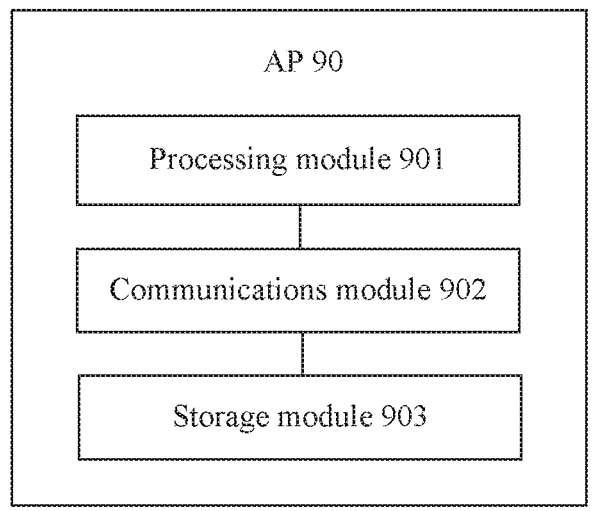
FIG. 9 is a schematic structural diagram of still another AP according to an embodiment of this application.

When an integrated unit is used, FIG. 9 is a possible schematic structural diagram of the AP in the foregoing embodiment. The AP 90 may include a processing module 901 and a communications module 902. The processing module 901 is configured to control and manage an action of the AP 90. The communications module 902 is further configured to support the AP 90 in communicating with another network entity. The AP 90 may further include a storage module 903, configured to store program code and data of the AP 90.

The processing module 901 may be the processor 301 in the physical structure of the AP 30 shown in FIG. 3, and may be a processor or a controller, for example, may be a CPU, a general-purpose processor, a DSP, an ASIC, an FPGA or another programmable logic device, a transistor logic device, a hardware component, or any combination thereof. The processing module 901 may implement or execute various examples of logical blocks, modules, and circuits that are described with reference to content disclosed in this application. Alternatively, the processor 901 may be a combination for implementing a computing function, for example, a combination including one or more microprocessors, a combination of a DSP and a microprocessor, or the like. The communications module 902 may be the transceiver 303 in the physical structure of the AP 30 shown in FIG. 3. The communications module 902 may be a communications port, or may be a transceiver, a transceiver circuit, a communications interface, or the like. The storage module 903 may be the memory 302 in the physical structure of the AP 30 shown in FIG. 3.

When the processing module 901 is a processor, the communications module 902 is a transceiver, and the storage module 903 is a memory, the AP 90 in FIG. 9 in this embodiment of this application may be the AP 30 shown in FIG. 3.

As described above, the terminal provided in this embodiment of this application may be configured to implement the method implemented in the foregoing embodiments of this application. For ease of description, only parts related to this embodiment of this application are shown. For undisclosed specific technical details, refer to the embodiments of this application.

Figure 10:
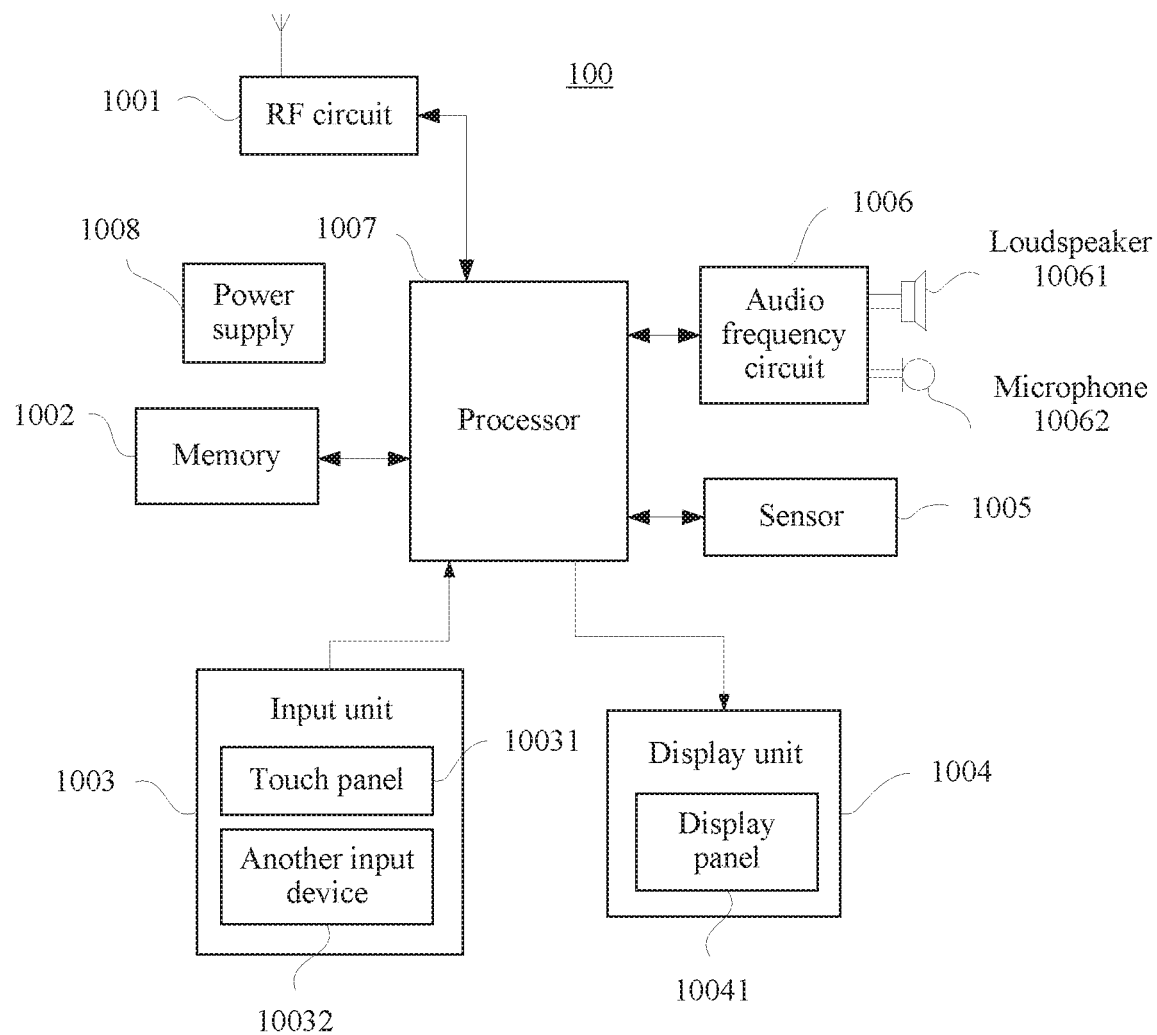
FIG. 10 is a schematic structural diagram of a mobile phone according to an embodiment of this application.

In an embodiment of this application, an example in which a terminal is a mobile phone is used for description. FIG. 10 is a block diagram of a partial structure of a mobile phone 100 related to the embodiments of this application.

As shown in FIG. 10, the mobile phone 100 includes components such as a radio frequency (radio frequency, RF) circuit 1001, a memory 1002, an input unit 1003, a display unit 1004, a sensor 1005, an audio frequency circuit 1006, a processor 1007, and a power supply 1008. A person skilled in the art may understand that the structure of the mobile phone shown in FIG. 10 does not constitute a limitation on the mobile phone, and the mobile phone may include more or fewer components than those shown in the figure, or include a combination of some components, or include components differently disposed.

The following describes all constituent components of the mobile phone 100 in detail with reference to FIG. 10.

The RF circuit 1001 may be configured to: send and receive signals in an information transmitting/receiving process or a call process. In particular, after receiving downlink information from a base station, the RF circuit 1001 sends the downlink information to the processor 1007 for processing. In addition, the RF circuit 1001 sends uplink data to the base station. Generally, the RF circuit 1001 includes but is not limited to an antenna, at least one amplifier, a transceiver, a coupler, a low noise amplifier (low noise amplifier, LNA), and a duplexer. In addition, the RF circuit 1001 may communicate with a network and another device through wireless communication.

Although not shown, the mobile phone 100 may further include a Wireless Fidelity (WIreless-Fidelity, WiFi) module, a Bluetooth module, an optical module, or the like.

The memory 1002 may be configured to store a software program and a module. The processor 1007 executes various function applications and data processing of the mobile phone 100 by running the software program and the module stored in the memory 1002.

The memory 1002 may mainly include a program storage area and a data storage area. The program storage area may store an operating system, an application program required by at least one function (such as an audio play function or an image play function), and the like. The data storage area may store data (such as audio data, image data, or an address book) created based on use of the mobile phone 100, and the like.

In addition, the memory 1002 may include a high-speed random access memory, and may further include a non-volatile memory, such as at least one magnetic disk storage device, a flash memory device, or another volatile solid-state storage device.

The input unit 1003 may be configured to: receive entered digit or character information or voice information, and generate signal input related to user settings and function control of the mobile phone 100.

Specifically, the input unit 1003 may include a touchscreen 10031 and another input device 10032. The touchscreen 10031 is also referred to as a touch panel and may collect a touch operation performed by the user on or near the touchscreen (such as an operation performed by the user on the touchscreen 10031 or near the touchscreen 10031 by using any proper object or accessory, such as a finger or a stylus), and drive a corresponding connection apparatus based on a preset program.

Optionally, the touchscreen 10031 may include two parts: a touch detection apparatus and a touch controller.

The touch detection apparatus detects a touch direction of the user, detects a signal brought by the touch operation, and transmits the signal to the touch controller. The touch controller receives touch information from the touch detection apparatus, converts the touch information into touch point coordinates, then sends the touch point coordinates to the processor 1007, and can receive and perform a command sent by the processor 1007.

In addition, the touchscreen 10031 may be implemented by using a plurality of types such as a resistive type, a capacitive type, an infrared ray, and a surface acoustic wave. In addition to the touchscreen 10031, the input unit 1003 may include another input device 10032. Specifically, another input device 10032 may include but is not limited to one or more of a physical keyboard, a function key (such as a volume control key or an on/off key), a trackball, a mouse, a joystick, and the like.

The display unit 1004 may be configured to display information entered by the user or information provided for the user, and various menus of the mobile phone 100.

The display unit 1004 may include a display panel 10041. Optionally, the display panel 10041 may be configured in a form such as a liquid crystal display (liquid crystal display, LCD) or an organic light-emitting diode (organic light-emitting diode, OLED). Further, the touchscreen 10031 may cover the display panel 10041. After detecting the touch operation on or near the touchscreen 10031, the touchscreen 10031 transmits the touch operation to the processor 1007 to determine a type of a touch event; and then the processor 1007 provides corresponding visual output on the display panel 10041 based on the type of the touch event.

In FIG. 10, the touchscreen 10031 and the display panel 10041 are used as two independent components to implement input and input functions of the mobile phone 100. However, in some embodiments, the touchscreen 10031 and the display panel 10041 may be integrated to implement the input and output functions of the mobile phone 100.

The sensor 1005 may be a gravity sensor (gravity sensor), a magnetic manometer, or a GPS sensor. When the sensor 1005 is the gravity sensor, the sensor 1005 may detect an acceleration magnitude in each direction (generally three axes) of the mobile phone 100 may detect a magnitude and a direction of gravity when the sensor 1005 is stationary, and may be applied to an application used for identifying a mobile phone posture (for example, screen switching between landscape and portrait modes, a related game, or magnetometer posture calibration), a function related to vibration identification (such as a pedometer or a knock), and the like. When the sensor 1005 is the magnetic manometer, the sensor 1005 may detect a geomagnetic field signal. When the sensor 1005 is the GPS sensor, the sensor 1005 may detect a geographic location of the mobile phone 100. Certainly, the mobile phone 100 may include a plurality of types of sensors. Only the sensor 1005 is described herein and is not a limitation to a quantity and a type.

The mobile phone 100 may further include another sensor, such as a light sensor. Specifically, the light sensor may include an ambient light sensor and an optical proximity sensor.

The ambient light sensor may adjust luminance of the display panel 10041 based on brightness of ambient light, and the optical proximity sensor may detect whether an object approaches or touches the mobile phone, and may turn off the display panel 10041 and/or backlight when the mobile phone 100 approaches an ear. For other sensors such as a gyroscope, a barometer, a hygrometer, a thermometer, and an infrared sensor that may also be disposed on the mobile phone 100. Details are not described herein.

The audio frequency circuit 1006, a loudspeaker 10061, and a microphone 10062 may provide an audio interface between the user and the mobile phone 100. The audio frequency circuit 1006 may transmit, to the loudspeaker 10061, an electrical signal converted from received audio data, and the loudspeaker 10061 converts the electrical signal into a sound signal for output. In addition, the microphone 10062 converts a collected sound signal into an electrical signal, and the audio frequency circuit 1006 receives the electrical signal, converts the electrical signal into audio data, and outputs the audio data to the RF circuit 1001 to send the audio data to, for example, another mobile phone, or outputs the audio data to the memory 1002 for further processing.

As a control center of the mobile phone 100, the processor 1007 uses various interfaces and lines to connect all parts of the entire mobile phone, and performs various functions and data processing of the mobile phone 100 by running or executing the software program and/or the module stored in the memory 1002 and invoking data stored in the memory 1002, to perform overall monitoring on the mobile phone 100. Optionally, the processor 1007 may include one or more processing units. Preferably, an application processor and a modem processor may be integrated into the processor 1007. The processor 1007 performs same functions as the processor 201 in the terminal 20, so as to support the mobile phone 100 in implementing the solutions in the method embodiments of this application.

The application processor mainly processes an operating system, a user interface, an application program, and the like, and the modem processor mainly processes wireless communication. It may be understood that the foregoing modem processor may be not integrated into the processor 1007.

The mobile phone 100X) further includes the power supply 1008 (such as a battery) that supplies power to each component. Preferably, the power supply may be logically connected to the processor 1007 by using a power management system, so as to implement functions such as charging and discharging management and power consumption management by using the power management system.

In this embodiment of this application, the memory 1002 has same functions as the memory 202 shown in FIG. 2, and the processor 1007 has same functions as the processor 201 shown in FIG. 2.

The methods or algorithm steps described with reference to the content disclosed in this application may be implemented in a hardware manner, or may be implemented in a manner of executing a software instruction by a processor. The software instruction may include a corresponding software module. The software module may be stored in a RAM, a flash memory, a ROM, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or a storage medium in any other forms well-known in the art. A storage medium used as an example is coupled to the processor, so that the processor can read information from the storage medium, and can write information into the storage medium. Certainly, the storage medium may be a part of the processor. The processor and the storage medium may be located in an ASIC. In addition, the ASIC may be located in a core network interface device. Certainly, the processor and the storage medium may exist in the core network interface device as discrete components.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

A person of skill in the art should be aware that in one or more of the foregoing examples, the functions described in this application may be implemented by using hardware, software, firmware, or any combination thereof. When this application is implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer. It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of hardware in addition to a software function unit.

When the foregoing integrated unit is implemented in a form of a software function unit, the integrated unit may be stored in a computer-readable storage medium. The software function unit is stored in a storage medium and includes several instructions for instructing a computer device (which may be a personal computer, a server, or a network device) to perform some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A terminal, comprising:
   at least one processor; and
   a memory coupled to the at least one processor and storing programming instructions that, when executed by the at least one processor, cause the terminal to:
      obtain a charging type of each of a plurality of Access Points (APs) according to communications received from the plurality of APs, wherein the charging type comprises a traffic-free AP type, an unknown traffic charging AP type, and a traffic-charged AP type;
      display an AP list identifying the plurality of APs, the AP list being generated based on the charging type of each of the plurality of APs;
      automatically select an AP from the AP list for connection based on the charging type of each of the plurality of APs, wherein a connection priority of the traffic-free AP is higher than that of the unknown traffic charging AP type, and a connection priority of the unknown traffic charging AP type is higher than that of the traffic-charged AP.

2. The terminal according to claim 1, wherein the AP list comprises an identifier for each of the plurality of APs and the charging type of each of the plurality of APs.

3. The terminal according to claim 1, wherein the plurality of APs are displayed in descending order of the connection priorities.

4. The terminal according to claim 1, wherein the plurality of APs are displayed in descending order of signal strengths of the plurality of APs.

5. The terminal according to claim 1, wherein the automatically selecting the AP from the AP list for connection based on the charging type of each of the plurality of APs comprises:
   in response to determining that an AP of the traffic-free AP type exists in the AP list, selecting the AP of the traffic-free AP type for connection; and
   in response to determining that the AP of the traffic-free AP type does not exist but an AP of the unknown traffic charging AP type exists in the AP list, selecting the AP of the unknown traffic charging AP type for connection.

6. The terminal according to claim 1, wherein the selecting the AP from the AP list for connection based on the charging type of each of the plurality of APs comprises:
   in response to determining that an AP of the traffic-free AP type exists in the AP list, selecting the AP of the traffic-free AP type for connection;
   in response to determining that the AP of the traffic-free AP type does not exist but an AP of the unknown traffic charging AP type exists in the AP list, selecting the AP of the unknown traffic charging AP type for connection; and
   in response to determining that the AP of the traffic-free AP type does not exist in the AP list, and the AP of the unknown traffic charging AP type does not exist in the AP list, but an AP of the traffic-charged AP type exists in the AP list, selecting the AP of the traffic-charged AP type for connection.

7. The terminal according to claim 6, wherein the selecting the traffic-free AP for connection comprises:
   when the terminal is already connected to the AP of the traffic-charged AP type, selecting the AP of the traffic-free AP type for connection.

8. The terminal according to claim 1, wherein the obtaining the charging type of each of the plurality of APs comprises:
   receiving a scan response packet sent by each of the plurality of APs, wherein the scan response packet comprises an indication field indicating the charging type of the sender AP; and
   obtaining the charging type indicated by the indication field in the scan response packet sent by each of the plurality of APs.

9. An access point (AP) connection method, comprising:
   obtaining a charging type of each of a plurality of Access Points (APs) according to communications received from the plurality of APs, wherein the charging type comprises a traffic-free AP type, an unknown traffic charging AP type, and a traffic-charged AP type;
   displaying an AP list identifying the plurality of APs, the AP list being generated based on the charging type of each of the plurality of APs; and
   automatically selecting an AP from the AP list for connection based on the charging type of each of the plurality of APs, wherein a connection priority of the traffic-free AP is higher than that of the unknown traffic charging AP type, and a connection priority of the unknown traffic charging AP type is higher than that of the traffic-charged AP.

10. The method according to claim 9, wherein the AP list comprises an identifier for each of the plurality of APs and the charging type of each of the plurality of APs.

11. The method according to claim 9, wherein the plurality of APs are displayed in descending order of the connection priorities.

12. The method according to claim 9, wherein the plurality of APs are displayed in descending order of signal strengths of the plurality of APs.

13. The method according to claim 9, wherein the automatically selecting the AP from the AP list for connection based on the charging type of each of the plurality of APs comprises:
  in response to determining that an AP of the traffic-free AP type exists in the AP list, selecting the AP of the traffic-free AP type for connection; and
  in response to determining that the AP of the traffic-free AP type does not exist but an AP of the unknown charging AP type exists in the AP list, selecting the AP of the unknown charging AP type for connection.

14. The method according to claim 9, wherein the selecting the AP from the AP list for connection based on the charging type of each of the plurality of APs comprises:
  in response to determining that an AP of the traffic-free AP type exists in the AP list, selecting the AP of the traffic-free AP type for connection;
  in response to determining that the AP of the traffic-free AP type does not exist but an AP of the unknown charging AP type exists in the AP list, selecting the AP of the unknown charging AP type for connection; and
  in response to determining that the AP of the traffic-free AP type does not exist, and the AP of the unknown charging AP type does not exist in the AP list, but an AP of the traffic-charged AP type exists in the AP list, selecting the AP of the traffic-charged AP type for connection.

15. The method according to claim 14, wherein the selecting the traffic-free AP for connection comprises:
when a terminal is already connected to the AP of the traffic-charged AP type, selecting the AP of the traffic-free AP type for connection.

16. The method according to claim 9, wherein the obtaining the charging type of each of the plurality of APs comprises:
  receiving a scan response packet sent by each of the plurality of APs, wherein the scan response packet comprises an indication field indicating the charging type of the sender AP; and
  obtaining the charging type indicated by the indication field in the scan response packet sent by each of the plurality of APs.

17. A non-transitory computer-readable storage medium having computer-readable program code stored therein that, in response to execution by a processor of an apparatus, cause the apparatus to perform operations comprising:
  obtaining a charging type of each of a plurality of Access Points (APs) according to communications received from the plurality of APs, wherein the charging type comprises a traffic-free AP type, an unknown traffic charging AP type, and a traffic-charged AP type;
  displaying an AP list identifying the plurality of APs, the AP list being generated based on the charging type of each of the plurality of APs; and
  automatically selecting an AP from the AP list for connection based on the charging type of each of the plurality of APs, wherein a connection priority of the traffic-free AP is higher than that of the unknown traffic charging AP type, and a connection priority of the unknown traffic charging AP type is higher than that of the traffic-charged AP.

18. The non-transitory computer-readable storage medium according to claim 17, wherein the AP list comprises an identifier for each of the plurality of APs and the charging type of each of the plurality of APs.

19. The non-transitory computer-readable storage medium according to claim 17, wherein the plurality of APs are displayed in descending order of the connection priorities.

20. The non-transitory computer-readable storage medium according to claim 17, wherein the plurality of APs are displayed in descending order of signal strengths of the APs.

* * * * *